(12) United States Patent
Svenbrant et al.

(10) Patent No.: US 7,681,907 B2
(45) Date of Patent: Mar. 23, 2010

(54) VEHICLE SEATS

(75) Inventors: Emma Svenbrant, Gothenburg (SE); Séverine Wollin, Shanghai (CN); Håkan Sundmark, Alingsås (SE); Stephane Pretot, Lerum (SE); Gilles Garret, Rouen (FR)

(73) Assignee: Autoliv Development AB, Vargarda (SE)

( * ) Notice: Subject to any disclaimer, the term of this patent is extended or adjusted under 35 U.S.C. 154(b) by 169 days.

(21) Appl. No.: 10/541,137

(22) PCT Filed: Nov. 10, 2003

(86) PCT No.: PCT/SE03/01728

§ 371 (c)(1),
(2), (4) Date: Jun. 22, 2006

(87) PCT Pub. No.: WO2004/062970

PCT Pub. Date: Jul. 29, 2004

(65) Prior Publication Data
US 2006/0255572 A1 Nov. 16, 2006

(30) Foreign Application Priority Data
Jan. 10, 2003 (GB) .................................. 0300610.3

(51) Int. Cl.
*B60R 21/16* (2006.01)
(52) U.S. Cl. ............... 280/728.2; 280/728.3; 280/730.2
(58) Field of Classification Search ............ 280/728.2, 280/728.3, 730.2, 729, 743.1
See application file for complete search history.

(56) References Cited

U.S. PATENT DOCUMENTS

| | | |
|---|---|---|
| 5,499,840 A | 3/1996 | Nakano |
| 5,503,428 A | 4/1996 | Awotwi et al. |
| 5,536,038 A | 7/1996 | Bollaert et al. |
| 5,556,128 A | 9/1996 | Sinnhuber et al. |
| 5,765,863 A | 6/1998 | Storey et al. |
| 5,779,263 A | 7/1998 | Lane, Jr. et al. |
| 5,803,485 A | 9/1998 | Acker et al. |
| 5,944,341 A * | 8/1999 | Kimura et al. ........... 280/728.3 |
| 5,944,342 A | 8/1999 | White, Jr. et al. |
| 5,957,486 A * | 9/1999 | Taguchi et al. .............. 280/729 |
| 6,045,151 A | 4/2000 | Wu |

(Continued)

FOREIGN PATENT DOCUMENTS

DE 195 29 829 C1 10/1996

(Continued)

*Primary Examiner*—Toan C To
(74) *Attorney, Agent, or Firm*—Brinks Hofer Gilson & Lione

(57) ABSTRACT

An air-bag unit for a vehicle seat including a squab (2) and a back-rest (5). The back-rest (5) includes a frame which is covered with upholstery (7). An air-bag unit (22) has an inflatable air-bag (28) connected to an inflator (23) to inflate the air-bag 28. The air-bag unit 22 is mounted to the back-rest frame (6) so as to be located inboard of part of the frame (10) with the inflator (23) being located adjacent the rearmost region of the frame (6) and positioned to direct gas into the air-bag (28) in a generally forward direction. The arrangement is such that actuation of the air-bag unit (22) will cause the air-bag (28) to inflate so that at least part of the air-bag (28) lies between the frame (6) and the occupant (16) of the seat.

33 Claims, 5 Drawing Sheets

U.S. PATENT DOCUMENTS

| | | | |
|---|---|---|---|
| 6,062,593 A | 5/2000 | Satani et al. | |
| 6,155,593 A * | 12/2000 | Kimura et al. | 280/728.2 |
| 6,206,466 B1 * | 3/2001 | Komatsu | 297/216.13 |
| 6,341,797 B1 * | 1/2002 | Seo | 280/730.2 |
| 6,352,304 B1 * | 3/2002 | Sorgenfrei | 297/216.13 |
| 6,450,528 B1 * | 9/2002 | Suezawa et al. | 280/730.2 |
| 6,578,911 B2 * | 6/2003 | Harada et al. | 297/216.13 |
| 7,004,496 B2 * | 2/2006 | Bossecker et al. | 280/730.2 |
| 7,134,686 B2 * | 11/2006 | Tracht et al. | 280/730.2 |
| 7,232,150 B2 * | 6/2007 | Nagayama | 280/730.2 |
| 7,311,325 B2 * | 12/2007 | Tracht et al. | 280/730.2 |

FOREIGN PATENT DOCUMENTS

| | | |
|---|---|---|
| DE | 197 30 148 A1 | 1/1998 |
| DE | 199 50 702 A1 | 4/2001 |
| EP | 0 818 365 A1 | 1/1998 |
| EP | 818 365 A1 | 1/1998 |
| EP | 0 826 565 A2 | 3/1998 |
| EP | 940 299 A1 | 9/1999 |
| JP | 10-100764 A2 | 4/1998 |
| JP | 2000-85515 | 3/2000 |
| JP | 2001-114060 | 4/2001 |
| WO | WO 2004/094199 A1 | 11/2004 |

* cited by examiner

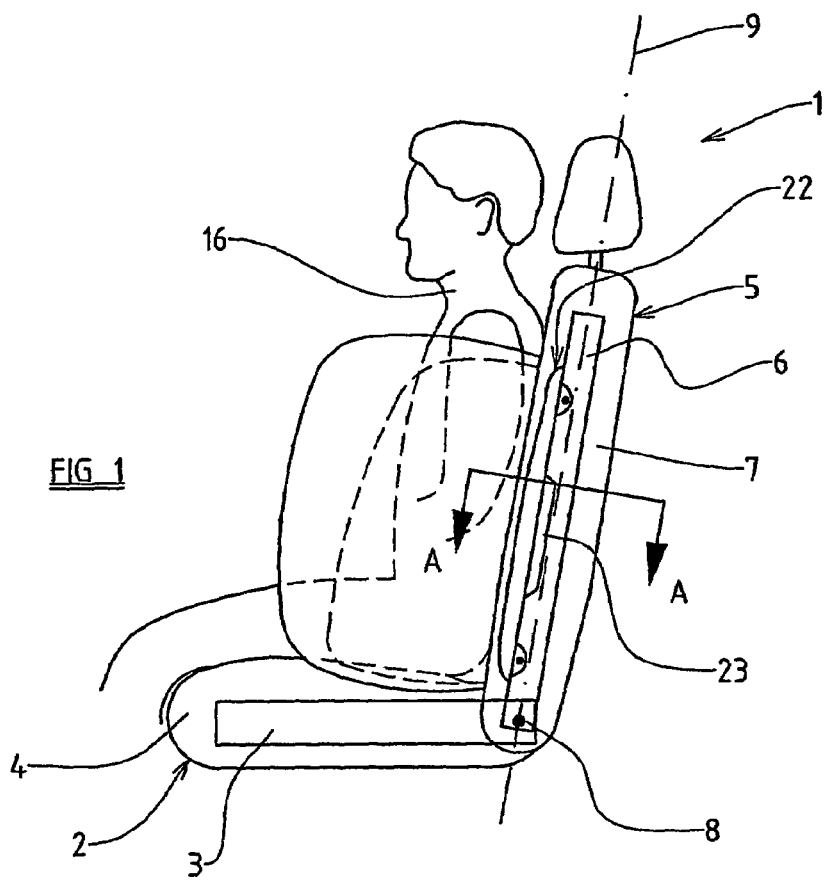
FIG_1
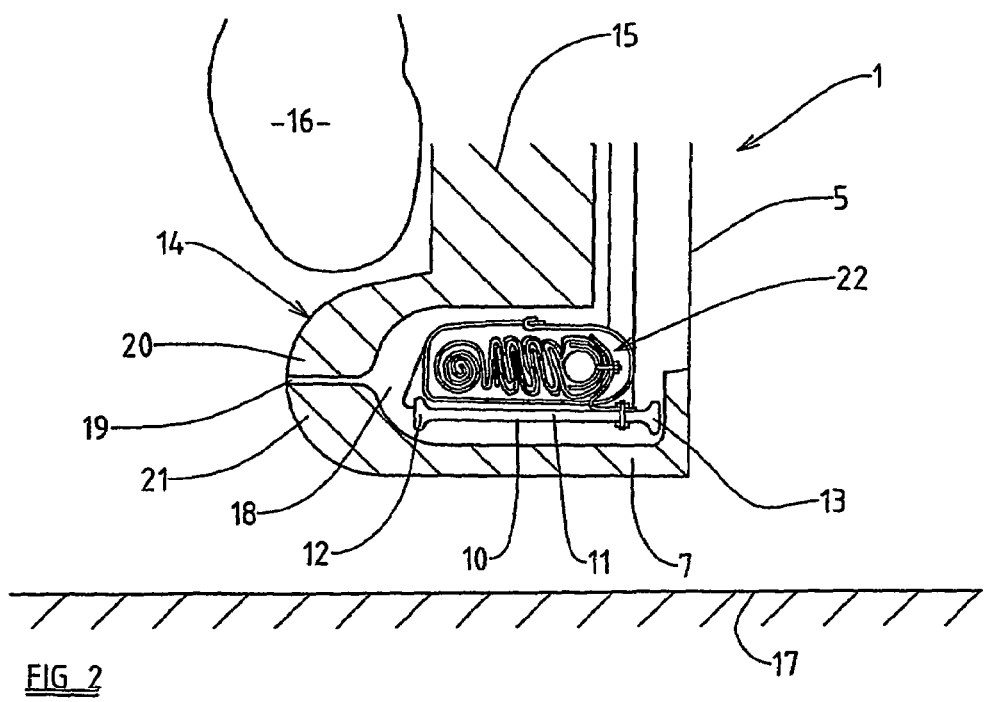
FIG_2

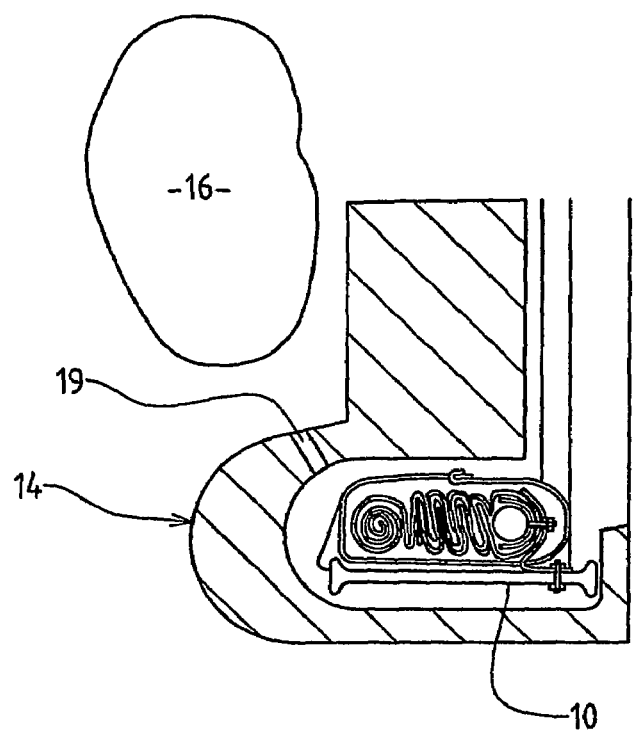
FIG_5
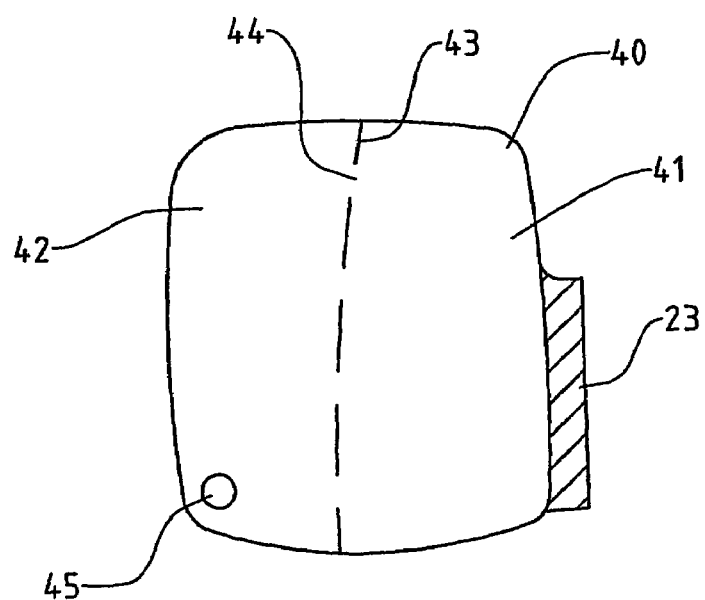
FIG_6

(12) United States Patent
US 7,681,907 B2

VEHICLE SEATS

CROSS REFERENCE TO RELATED APPLICATION

This application claims priority to PCT/SE2003/001728, filed Nov. 10, 2003 and GB 0300610.3, filed Jan. 10, 2003.

FIELD OF THE INVENTION

The present invention relates to a vehicle seat, and more particularly relates to a vehicle seat provided with an air-bag unit.

BACKGROUND OF THE INVENTION

It is known to provide motor vehicle seats with one or more air-bags configured so that the air-bag may be inflated in a side impact crash situation, in order to provide lateral protection to an occupant of the seat. A typical such known type of arrangement comprises an air-bag module mounted to the back-rest of a vehicle seat, the air-bag module being arranged so that the air-bag is inflated in a forwards direction relative to the back-rest, such that the air-bag is deployed to the side of an occupant of the seat. In this manner, the inflated air-bag extends between the occupant and the side panel, door or window of the motor vehicle.

The above-mentioned type of vehicle seat and "side air-bag" arrangement can suffer from disadvantages. For example, in current side air-bag systems of the general type described above, there can be a significant distance separating an occupant of the seat and the air-bag during the early stages of deployment of the air-bag. If this is the case, then it is possible for the occupant of the seat, whose body moves relative to the seat in the event of a side impact crash situation by virtue of its inertia, may not immediately bear against the inflating air-bag.

Also, it is important for a side air-bag mounted to the back-rest of a vehicle seat to deploy in a manner which does not interfere with a person occupying the seat in an abnormal position, such as, for example, where the occupant may be leaning to one side so that part of the occupant's body lies in front of the air-bag rather than to the side of the air-bag. A conventional side air-bag inflating in a forwards direction could directly contact a seat occupant sitting in such a position.

SUMMARY OF THE INVENTION

The present invention therefore seeks to provide an improved vehicle seat.

Accordingly, the present invention provides a vehicle seat having a squab (or seat cushion) and a back-rest, the back-rest including a frame covered with upholstery; and an air-bag unit with an inflatable air-bag connected to an inflator to inflate the air-bag; the air-bag unit being mounted to the back-rest frame so as to be located inboard of part of the frame with the inflator being positioned to direct gas into the air-bag in a generally forward direction relative to the back-rest. The air-bag unit arranged in this manner will cause the air-bag to inflate so that at least part of the air-bag lies between the frame and an occupant of the seat; wherein the air-bag unit is mounted such that the inflator is located adjacent the rear-most region of the frame, so that a significant length of air-bag bears against the frame as the air-bag is inflated.

Preferably, the air-bag unit comprises a cover within which the air-bag is initially packed, the cover defining a break-line configured to break upon inflation of the air-bag such that the inflating air-bag bursts out of the cover; the cover being configured such that part of the cover engages the back-rest frame upon inflation of the air-bag so as to extend substantially forwardly of the frame and to define a support against which the air-bag bears upon inflation. Advantageously, the above-mentioned part of the cover is configured to engage the frame so as also to extend inwardly of the frame. Conveniently, the part of the cover comprises a reinforcing rib.

Preferably, the air-bag unit of this invention includes an inner air-bag and an outer air-bag, the inner air-bag being provided inside the outer air-bag, and both airbags being connected to the inflator so that they are both inflated together upon actuation of the air-bag unit. Advantageously, the outer air-bag is larger than the inner air-bag in the sense that it extends further forwards from the inflator when fully inflated.

Conveniently, the inner and outer air-bags are initially provided in a packed condition in which the inner bag and at least part of the outer bag are folded together in a substantially zigzag manner about fold lines lying substantially parallel to the axis of the back-rest extending away from the squab.

Advantageously, the inner and outer air-bags are initially provided in a packed condition in which the inner bag and at least part of the outer bag are spirally rolled together about an axis of the back-rest extending away from the squab.

Preferably, part of the outer air-bag extending past the forwardmost extent of the inner air-bag is initially spirally rolled about an axis substantially parallel to the axis of the backrest extending away from the squab. Conveniently, part of the outer air-bag extending past the forwardmost extent of the inner air-bag is initially folded in a substantially zig-zag manner about fold lines lying substantially parallel to the axis of the back-rest extending away from the squab.

Advantageously, the air-bag unit comprises a single air-bag having two inflatable chambers, the first of said chambers being located immediately adjacent the inflator, and the second chamber being located forwardly of the first chamber so as to be spaced from the inflator by the first chamber, the air-bag being configured such that upon actuation of the air-bag unit, the first said chamber is inflated substantially fully before the second chamber begins to inflate substantially. Conveniently, the two chambers are separated by a tear-seam configured to rupture or tear when the first chamber becomes inflated to a predetermined gas pressure, so as to then allow the second chamber to be inflated.

Preferably, the two chambers are separated by a seam having one or more apertures along its length to allow the passage of gas therethrough. Advantageously, a vent hole is provided in the air-bag in the region of the forwardmost part of the second chamber.

Conveniently, the air-bag unit comprises a single air-bag configured such that the forwardmost region of the air-bag remote from the inflator is folded inwardly of itself to define a re-entrant portion. Preferably, adjacent regions of the re-entrant portion of the air-bag are initially stitched together by stitching to define a tear-seam configured to tear or rupture upon inflation of the air-bag.

Advantageously, the air-bag is initially provided in a packed condition in which at least part of the air-bag is folded in a substantially zigzag manner about fold lines lying substantially parallel to the axis of the back-rest extending away from the squab. Conveniently, the air-bag is initially provided in a packed condition in which at least part of the air-bag is initially spirally rolled about an axis substantially parallel to the axis of the backrest extending away from the squab.

Preferably, the air-bag unit comprises an inboard air-bag and an outboard air-bag, the inboard air-bag being located inboard of the outboard air-bag and the outboard air-bag being located between the inboard air-bag and said part of the frame, both of said air-bags being connected to the same inflator. Advantageously, the two said air-bags are sized such that the inboard air-bag extends a greater distance between said part of the frame and the seat occupant than the outboard air-bag.

Conveniently, the two said air-bags are sized such that the outboard air-bag extends further from the inflator. Preferably, the inboard and outboard air-bags are initially provided in a packed condition in which the inboard bag and at least part of the outboard bag are folded together in a substantially zigzag manner about fold lines lying substantially parallel to the axis of the back-rest extending away from the squab.

Conveniently, the inboard and outboard air-bags are initially provided in a packed condition in which the inboard bag and at least part of the outboard bag are spirally rolled together about an axis substantially parallel to the axis of the back-rest extending away from the squab. Advantageously, part of the outboard air-bag extending past the forwardmost extent of the inboard air-bag is initially spirally rolled about an axis substantially parallel to the axis of the backrest extending away from the squab.

Preferably, part of the outboard air-bag extending past the forwardmost extent of the inboard air-bag is initially folded in a substantially zig-zag manner about fold lines lying substantially parallel to the axis of the back-rest extending away from the squab.

BRIEF DESCRIPTION OF THE DRAWINGS

So that the present invention may be more readily understood, and so that further features thereof may be appreciated, embodiments of the invention may now be described, by way of example, with reference to the accompanying drawings, in which:

FIG. 1 is a schematic side view of a vehicle seat in accordance with a first embodiment of the present invention;

FIG. 2 is a sectional view taken along line A-A in FIG. 1, illustrating one side part of the back-rest of the seat illustrated in FIG. 1;

FIG. 5 is a view corresponding generally to that of FIG. 2, illustrating an alternative configuration of the upholstery of the back-rest of the vehicle seat;

FIG. 6 is a schematic side view of a single, sub-divided air-bag in accordance with a second embodiment of the present invention;

DETAILED DESCRIPTION OF THE INVENTION

Figure 3:
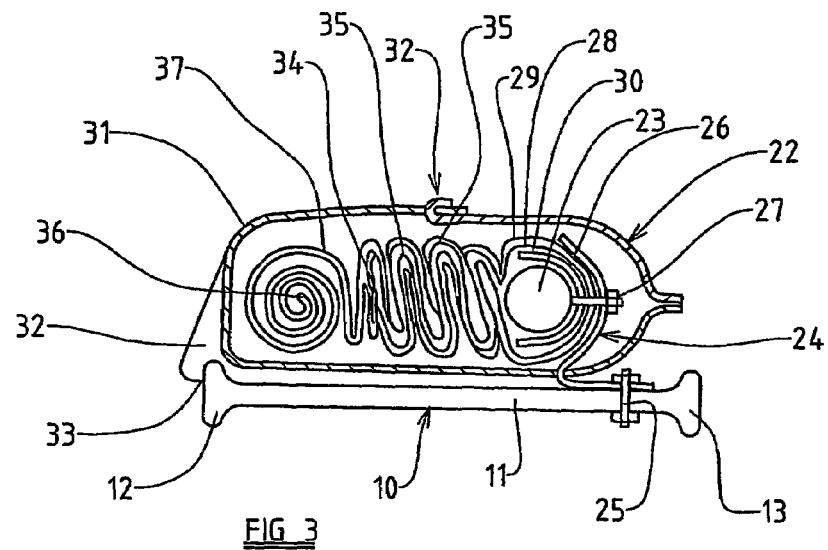
FIG. 3 is an enlarged view of the air-bag unit illustrated in Figure

Referring initially to FIGS. 1 and 2 of the drawings, a vehicle seat 1 in accordance with the present invention is illustrated. The vehicle seat has a squab 2 (or seat cushion) comprising a squab frame 3 which is covered by squab upholstery 4. Extending upwardly and slightly rearwardly from the rear part of the squab 2 is a back-rest 5 which comprises a back-rest frame 6 covered with back-rest upholstery 7. The lowermost part of the back-rest frame 6 is pivotally connected at hinge 8 to the rear part of the squab frame 3 such that the angle of inclination of the back-rest 5 relative to the squab 2 can be adjusted in a conventional manner. The back-rest 5 has a major axis 9 which extends away from the squab 2.

The upholstery 4 and 7 of the squab 2 and the back-rest 5 respectively typically comprises foam material covered with an outer covering of fabric, plastic or leather. The upholstery 4 and 7 may additional comprises springs in a conventional manner.

As illustrated most clearly in FIG. 2, the frame 6 of the back-rest includes a pair of spaced-apart metal I-section beams 10 (only one such beam 10 being illustrated in FIG. 2), each of which extends along a respective side region of the back-rest 5 so as to lie substantially parallel to the major axis 9 of the back-rest. Each beam 10 comprises a generally planar side plate 11 carrying a pair of edge flanges 12 and 13 at its front and rear edges, respectively. It should be noted that whilst the illustrated embodiment comprises an I-section beam, other configurations of beams 10 could be used instead such as, for example, C-section or L-section beams.

As illustrated most clearly in FIG. 2, the upholstery 7 of the back-rest 5 is wrapped around the frame 6 so as to define a bolster 14 at each side of the back-rest 5 (only one such bolster 14 being illustrated in FIG. 2). Each bolster 14 extends forwardly of the central region 15 of the back-rest so as to be located adjacent the side of an occupant 16 sitting in the seat 1, thus providing lateral support. The bolster 14 illustrated in FIG. 2 is the outboard bolster 14 of the seat and hence extends part-way between the seat occupant 16 and the side surface 17 of the associated motor vehicle 17.

In the region of the outboard bolster 14 illustrated in FIG. 2, there is provided a cavity 18 in the upholstery 7 of the back-rest, within which the beam 10 is received. In the forwardmost region of the cavity 19, along the front of the bolster 14, there is provided a pre-defined break line 19 in the upholstery, along which the immediately adjacent regions of the upholstery 20 and 21 are releasably secured to one another in a conventional manner, for example, using fabric hook-and-loop type fasteners such as that sold under the Trade Mark VELCRO. The break line 19 of the arrangement illustrated in FIG. 2 is illustrated being located substantially centrally along the front edge of the bolster 14. However, it should be appreciated that the break line 19 could be located slightly further inboard of this position, such as illustrated in FIG. 5, in which it will be seen that the break line 19 is located on the inside part of the bolster 14, nearer to the occupant 16.

Returning again to consider FIG. 2, an air-bag unit 22 is provided within the upholstery 7 of the back-rest 5, and is mounted to the beam 10 within the cavity 18. As illustrated in FIG. 1, the air-bag unit 22 is generally elongate and is oriented such that it is substantially parallel to the major axis 9 of the back-rest 5 extending away from the squab 2.

As seen most clearly in FIG. 3, which represents an enlarged view of the air-bag unit 22 and the beam 10, the air-bag unit 22 includes an inflator 23 such as, for example, a gas generator. The inflator 23 is of cylindrical and elongate form, and is located generally centrally along the length of the air-bag unit 22 (as best shown in FIG. 1). The inflator 23 is secured to the inboard side of the side plate 11 of the beam 10 via a mounting bracket 24. As will be seen in FIG. 3, the mounting bracket 24 is secured to the rearmost part of the beam 10, just forwards of the rear edge flange 13, by way of a conventional nut and bolt fastener arrangement 25. From this point, the mounting bracket 24 extends forwardly, alongside the inner surface of the plate 11, and then turns inwardly and rearwardly so as to define an arcuate region 26 which defines a concave recess within which the inflator 23 is received, the inflator 23 being mounted to the arcuate region 26 of the mounting bracket 24 by way of another conventional nut and bolt fastener arrangement 27. It will therefore be seen that the inflator 23 is located inboard of the beam 10, and generally adjacent the rearmost region of the beam 10 of the frame 6.

The air-bag unit 22 also comprises a pair of inflatable air-bags 28 and 29, made from fabric material, one air-bag 28 (the inner air-bag) is located inside the other air-bag 29 (the outer air-bag), and both extend generally forwardly from the inflator 23 into the main part of the cavity 18. The inner and outer air-bags 28 and 29 are both mounted between the arcuate region 26 of the mounting bracket 24 and a deflector shield 30 having a generally C-shaped cross-section. The nut and bolt fastener 27 mounting the inflator 23 to the mounting bracket 24 passes through the deflector shield 30, the inner air-bag 28 and the outer air-bag 29, to hold all of these components tightly together. The deflector shield 30 serves to protect the fabric of the inner and outer air-bags 28 and 29 from gas generated by the inflator 23 under high pressure, in the event that the air-bag unit 1 is actuated.

As illustrated in FIG. 3, the inner and outer air-bags 28 and 29 are initially provided in a packed condition, in which they are packed by a combination of zig-zag folds and roll folding, within a protective cover or housing 31. The housing 31 extends forwardly, from the general region of the inflator 23, to terminate at a position substantially adjacent, and inboard of, the forwardmost edge flange 12 of the beam 10. This forwardmost region of the housing 31 carries a forwardly and outwardly-directed reinforcing rib 32 which has a cut-out notch 33 configured to receive the innermost part of the forward end flange 12. The inboard region of the cover or housing 31 is provided with a tear-line 32A which is configured to break, for example by tearing or otherwise rupturing, in the event that the air-bags 28 and 29 are inflated upon actuation of the air-bag unit 22.

As mentioned above, the inner and outer air-bags 28 and 29 are initially packed through a combination of zig-zag folds and roll folding. In particular, it will be seen that the outer air-bag 29 is larger than the inner air-bag 28 in the sense that the outer air-bag 29 extends further forwards from the inflator 23, than does the inner air-bag 28. It can therefore be seen that the inner air-bag 28 terminates at a position indicated at 34, in the initial packed condition illustrated in FIG. 3, but that the outer air-bag 29 extends further away from the inflator 23, from this point 34. The inner air-bag 28 and the region of the outer air-bag 29 extending over the inner air-bag 28 are folded together in a substantially zig-zag manner about a plurality of fold lines 35, each fold line 35 lying substantially parallel to the axis 9 of the back-rest 5 extending away from the squab 2. However, the forwardmost region of the outer air-bag 29 which extends past the forwardmost point 34 of the inner air-bag 28, is initially packed by being spirally rolled by an axis substantially parallel to the axis 9 of the back-rest 5 extending away from the squab 2. It will be seen that the outer air-bag 29 is rolled such that its innermost turn 36 is located forwardly and slightly outboard of the initial spiral turn 37.

Turning now to consider FIG. 4, actuation of the air-bag unit 22 described above will now be explained. Upon actuation of the air-bag unit 22, for example when an ignition signal indicative of an imminent or extant crash situation is received from a crash sensor, the inflator 23 is actuated which serves to expel gas into the initially packed inner and outer air-bags 28 and 29. This causes both air-bags to inflate and unfold, from the region of the inflator 23, in a forwards direction relative to the back-rest 5 of the seat.

As they inflate, the air-bags 28 and 29 rupture the housing 31, along the predefined tear line 32A, so as to burst out of the housing 31. Then, the inflating air-bags 28 and 29 also burst through the break line 19 of the bolster upholstery so as to urge the regions of the upholstery 20 and 21 immediately adjacent the break line apart.

Figure 4:
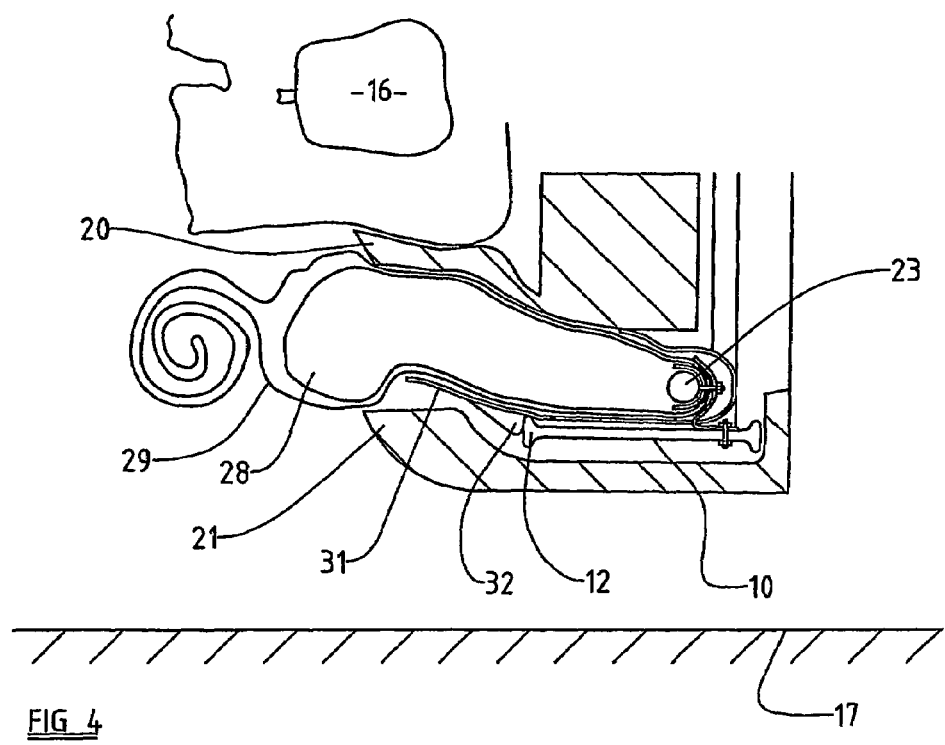
FIG. 4 is a view corresponding generally to that of FIG. 2, but illustrating the arrangement at a stage during actuation of the air-bag unit.

FIG. 4 illustrates the inner and outer air-bags 28 and 29 during an early stage of their inflation following rupture of the housing 31 and bursting of the bolster upholstery. It will be seen from this drawing that the housing 31 ruptures such that the forwardmost part of the housing 31 pivots via the notch 33 about the innermost part of the forward edge flange 12. However, the reinforcing rib 32 carried by the forwardmost region of the housing 31 serves to bear against the edge flange 12 after a pre-determined degree of rotation, in order to limit the degree of this pivoting movement of the cover or housing 31, and hence to prevent the forwardmost part of the housing 31 moving past the position illustrated in FIG. 4, in which it will be seen that the forwardmost part of the ruptured cover or housing 31 extends forwardly from the beam 10, but also extends generally inboard from the beam 10, so as to be directed generally towards the seat occupant 16.

Because the inner air-bag 28 is smaller than the outer air-bag 29, the smaller air-bag 28 reaches a fully-inflated condition significantly earlier during actuation of the air-bag arrangement 22, than does the outer air-bag 29. FIG. 4 illustrates the inner air-bag 28 approaching its fully-inflated condition, and it will be seen that at this stage of deployment, both air-bags 28 and 29 have been inflated such that the zig-zag folds 35 have all become unfolded, but that the initially rolled end region of the outer air-bag 29 has still not become inflated. Because the inner air-bag 28 quickly reaches a condition of full inflation, it will be seen that the air-bag arrangement 22, even during an early stage of its deployment, provides a significant width of the inflated air-bag and hence causes the innermost part of the upholstery 20 initially defining the bolster 14, to couple against the occupant 16 at an early stage of deployment. Of course in the arrangement of FIG. 5, where the upholstery break line 19 is located further inboard, there is less extent of upholstery to be urged towards the occupant 16. In this embodiment, the inner air-bag 28 bears directly against the seat occupant 16.

Subsequent expulsion of gas from the inflator 23 causes the forwardmost rolled region of the outer air-bag 29 to unfurl forwardly and towards the seat occupant 16 in an inboard manner, in order to provide a fully deployed air-bag extending substantially completely between the occupant 16 and the side surface 17 of the motor vehicle. Because the outer air-bag 29 inflates in this forwards and inwardly-directed manner, it serves to prevent, or at least reduce, the risk of injuring a seat occupant 16 who might, for example, be sitting in an abnormal position, in which part of the occupant's body extends across the bolster 14 of the back-rest 5.

It should be appreciated that the inboard location of the air-bag unit 22 relative to the beam 10 offers significant advantages during inflation of the air-bags 28 and 29. In particular, it will be seen that because the inflator is located adjacent the rear region of the beam 10 near rear edge flange 13, as the air-bags 28 and 29 are inflated, a significant length of air-bag lies alongside the beam 10 and bears against the inner surface of the beam 10. This prevents the inflating air-bags 28 and 29 from moving outboard in this region and hence ensures that the inflating air-bags are located sufficiently close to the occupant 16. Engagement of the rib 32 carried by the cover 31 with the end flange 12 also contributes to this technical advantage because it prevents the cover moving past the forwardly and inwardly directed position illustrated in FIG. 4. In this position, the cover also serves to urge the air-bags 28 and 29 towards the seat occupant 16 as they inflate.

Turning now to consider FIG. 6, there is illustrated in schematic form a single air-bag 40 which can be used to replace the inner and outer air-bags 28 and 29 of the above-described embodiment. The single air-bag 40 is again connected to the inflator 23, which is mounted to the beam 10 of the back-rest frame in a manner generally identical to that described above. However, in order to provide similar two-stage inflation characteristics to the dual air-bag arrangement described above with respect to FIGS. 1 to 5, the single air-bag unit 40 is sub-divided into a pair of separate inflatable chambers 41 and 42. The rearmost of these inflatable chambers 41 is located immediately adjacent the inflator 23 and is, because of this orientation, the first of the two chambers to receive gas expelled by the inflator 23 upon actuation of the air-bag arrangement. The front chamber 42 is located in front of the rear chamber 41 relative to the back-rest 5 so as to be spaced from the inflator 23 by the rear chamber 41.

The rear and front chambers 41 and 42 are separated from one another by a seam 43 which serves to secure together the two adjacent layers of fabric defining the air-bag 40. The seam 43 can take one of two different configurations. The first of these is a tear-seam arrangement in which the seam 43 is specially configured so as to rupture or tear when the rear chamber 41 becomes inflated to a predetermined gas pressure, so as then to allow gas produced by the inflator 23 to pass into the front chamber 42, so that the front chamber 42 can then also become inflated. It should therefore be appreciated that during the initial stages of inflation of the air-bag 40, the rear chamber 41 is separated from the front chamber 42, such that the rear chamber 41 is the only chamber to be inflated. However, when the gas pressure within the rear chamber 41 reaches a predetermined level at which with the rear chamber 41 becomes inflated to a sufficient degree to couple with the seat occupant 16 (in a similar way to the inflation of the inner air-bag 28 of the previously-described embodiment), the tear-seam 43 will rupture or tear, thereby allowing the front chamber 42 also to become inflated and to extend forwardly between the seat occupant 16 and the side surface 17 of the motor vehicle in generally the same manner as the outer air-bag 29 of the above-described embodiment.

Rather than using the tear-seam of the type described above, the seam 43 could be provided as a permanent seam, having a number of predefined gas outlet apertures 44 formed therealong. In such an arrangement, the gas outlet apertures 44 are sized and spaced from one another such that the rear chamber 41 becomes substantially fully inflated, before the front chamber 42. In either of the embodiments described with reference to FIG. 6, the front chamber 42 is preferably provided with a vent hole 45, which allows gas within the fully inflated air-bag 40 to vent to atmosphere in the event that the air-bag 40 is deformed through impact by the body of a seat occupant 16. This allows the air-bag 40 to provide a proper cushioning effect, reducing the chances of "rebound" which could result if the air-bag were not vented, and which could cause the body of a seat occupant 16 to rebound away from the fully inflated air-bag, causing injury.

Figure 7:
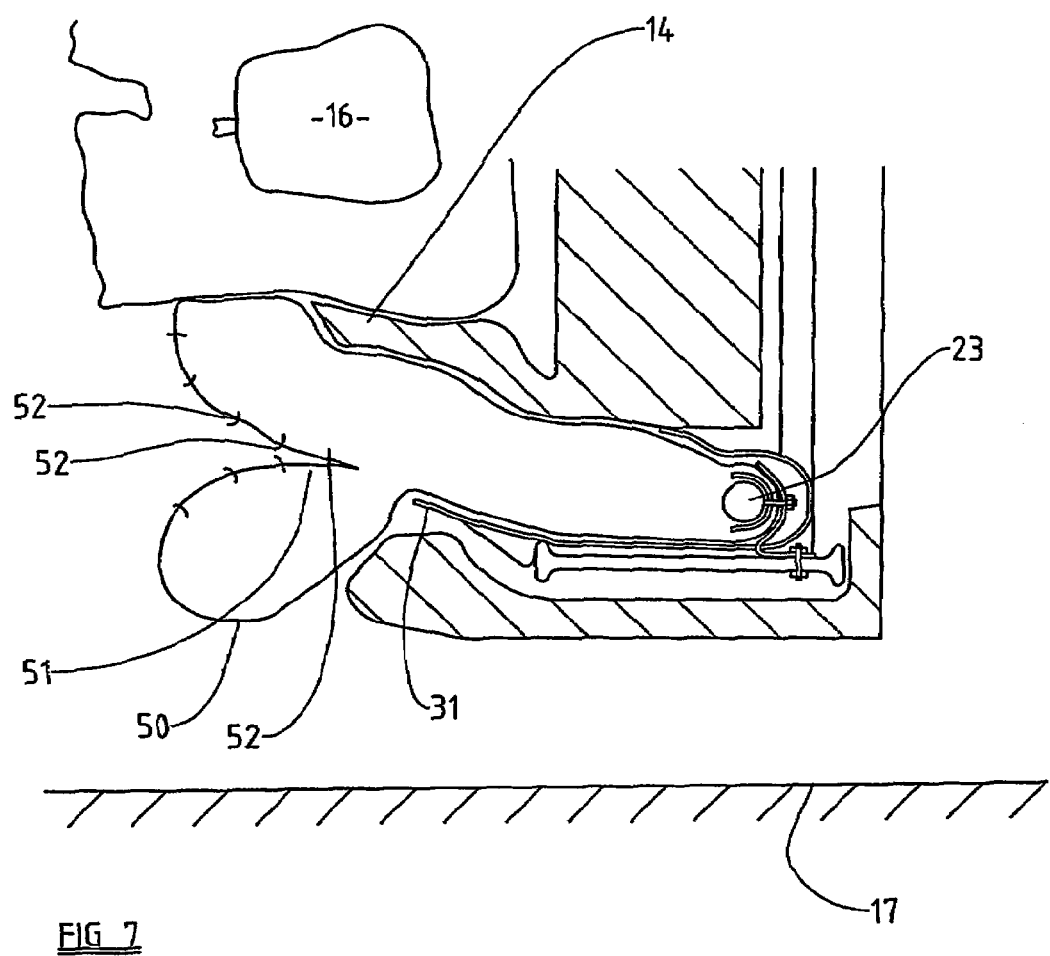
FIG. 7 is a view corresponding generally to that of FIG. 4, but illustrating a third embodiment of the present invention.

FIG. 7 illustrates a further embodiment of an air-bag unit 49 of the present invention, and illustrates an arrangement comprising a singular air-bag 50 during inflation. The singular air-bag 50 is initially provided in a packed condition within the housing 31 as described above, either by zig-zag folds or roll folding, or via a combination of both. However, in this arrangement, the air-bag 50 is initially provided in a condition in which its forwardmost region located remote from the inflator 23 is folded inwardly of itself to define a re-entrant portion 51. Preferably, adjacent regions of the re-entrant portion 51 of the air-bag 50 are initially stitched together by stitching 52 to define a tear-seam configured to tear or rupture during inflation of the air-bag 50. FIG. 7 illustrates this configuration of air-bag 50 during inflation, at a stage at which the tear-seam is being ruptured in this way. It will be seen that only the stitching 52 located nearest to the inflator 23 still remains intact, with all of the other stitches 52 having already been torn apart as the air-bag inflates. This arrangement seeks to replicate the inflation characteristics of the above-mentioned arrangements, such that the air-bag 50 inflates during the early stages of deployment so as to couple the upholstery initially forming in the inner part of the bolster 14 with the seat occupant 16, before the air-bag 50 becomes completely inflated so as to extend entirely between the seat occupant 16 and the side surface 17 of the motor vehicle.

Figure 8:
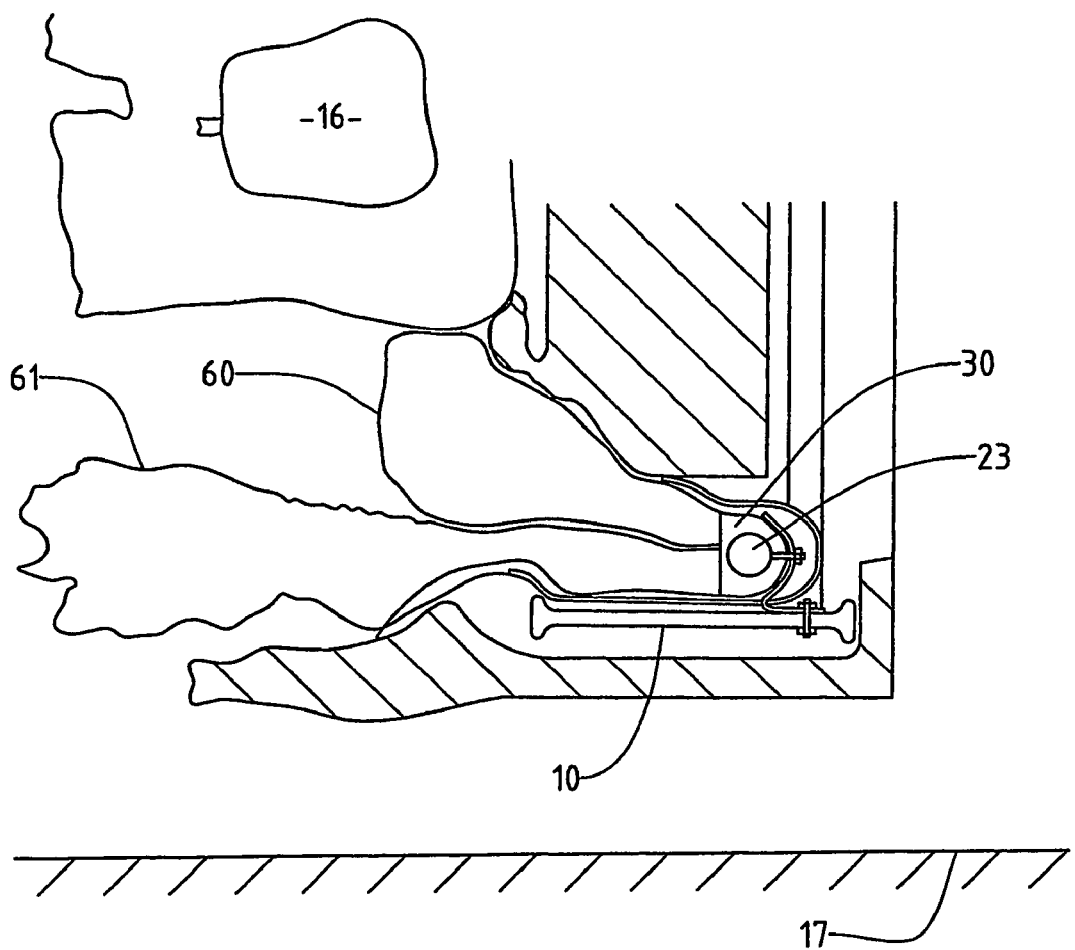
FIG. 8 is a view corresponding generally to that of FIG. 7, but illustrating a fourth embodiment of the present invention.

FIG. 8 illustrates a still further embodiment of an air-bag unit 59 of the present invention, which again uses two separate air-bags, but where the two air-bags are arranged to as to inflate adjacent one another, rather than inside one another as in the first above-described embodiment. In this arrangement, an inboard air-bag 60 and an outboard air-bag 61 are both connected to the same inflator 23 via a deflector shield 30, the inflator and deflector shield both being mounted to the beam 10 in a generally identical manner to that described above with regard to the first embodiment The inboard air-bag 60 is located so as to inflate generally between the outboard air-bag 61 and the seat occupant 16, whilst the outboard air-bag 61 is located so as to inflate between the inboard air-bag 60 and the beam 10. The inboard air-bag 60 is sized such that when it is fully inflated (as illustrated generally in FIG. 8) it has a greater width than the outboard air-bag 61, in the sense that the inboard air-bag 60 extends a greater distance between the beam 10 and the seat occupant 16 in a transverse direction than does the outboard air-bag 61. However, the outboard air-bag 61 is sized so as to extend further from the inflator 23 in a forwards direction than the inboard air-bag 60 when the two air-bags are fully inflated. This twin air-bag arrangement therefore again seeks to replicate the above-mentioned inflation characteristics of the previously-described embodiments, in which the inboard air-bag 60 more quickly reaches a fully inflated condition and hence couples with the seat occupant 16 at an early stage during deployment, whilst the outboard air-bag 61 thereafter continues to inflate so as to reach a fully deployed condition in which it extends across the side of the seat occupant 16, between the seat occupant 16 and the side of a motor vehicle 17.

Whilst the above-described embodiments use rolling or zig-zag folding to pack the air-bags, it should be appreciated that other convenient packing configurations could be used.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An air-bag unit for a vehicle seat having a squab and a back-rest, the back-rest including a frame covered with upholstery, the air-bag unit comprising: an inflatable air-bag connected to an inflator to inflate the air-bag upon deployment of the air-bag unit; and a mounting bracket, the air-bag unit being mounted to the back-rest frame via the mounting bracket so as to be located inboard of part of the frame with the inflator being positioned to direct gas into the air-bag in a generally forward direction relative to the back-rest such that the deployment of the air-bag unit will cause the air-bag to inflate so that at least part of the air-bag lies between the frame and an occupant of the vehicle seat; wherein the air-bag unit is mounted such that the inflator is located adjacent a rear-most region of the frame so that a significant length of the air-bag bears against the frame as the air-bag is inflated upon the deployment, urging the airbag towards the occupant.

2. An air-bag unit according to claim 1, wherein the air-bag unit further comprises a cover within which the air-bag is initially packed, the cover defining a break-line configured to break upon the deployment of the air-bag such that the inflating air-bag bursts out of the cover; the cover being configured such that a part of the cover engages the back-rest frame upon inflation of the air-bag so as to extend substantially forwardly of the frame and to define a support against which the air-bag bears upon inflation.

3. An air-bag unit according to claim 2, wherein the part of the cover is configured to engage the frame so as also to extend inboard of the frame.

4. An air-bag unit according to claim 2, wherein the part of the cover comprises a reinforcing rib.

5. An air-bag unit for a vehicle seat according to claim 1, wherein the air-bag unit comprises an inner air-bag and an outer air-bag, the inner air-bag being provided inside the outer air-bag, and both the inner and outer airbags being connected to the inflator so that the inner and outer air-bags are both inflated together upon the deployment of the air-bag unit.

6. An air-bag unit for a vehicle seat according to claim 5, wherein the outer air-bag is larger than the inner air-bag in that the outer air-bag extends further forwards from the inflator when fully inflated as compared with the inner air-bag.

7. An air-bag unit for a vehicle seat according to claim 5, wherein the inner and outer air-bags are initially provided in a packed condition in which the inner bag and at least part of the outer bag are folded together in a substantially zigzag manner about fold lines lying substantially parallel to a major axis of the back-rest extending away from the squab.

8. An air-bag unit for a vehicle seat having a squab and a back-rest, the back-rest including a frame covered with upholstery, the air-bag unit comprising: an inflatable air-bag connected to an inflator to inflate the air-bag upon deployment of the air-bag unit; the air-bag unit being mounted to the back-rest frame so as to be located inboard of part of the frame with the inflator being positioned to direct gas into the air-bag in a generally forward direction relative to the back-rest, such that the deployment of the air-bag unit will cause the air-bag to inflate so that at least part of the air-bag lies between the frame and an occupant of the vehicle seat, the air-bag unit mounted such that the inflator is located adjacent a rear-most region of the frame so that a significant length of the air-bag bears against the frame as the air-bag is inflated upon the deployment, wherein the air-bag unit comprises an inner air-bag and an outer air-bag, the inner air-bag being provided inside the outer air-bag, and both the inner and outer airbags being connected to the inflator so that the inner and outer air-bags are both inflated together upon the deployment of the air-bag unit, and wherein the inner and outer air-bags are initially provided in a packed condition in which the inner bag and at least part of the outer bag are spirally rolled together about a major axis of the back-rest extending away from the squab.

9. An air-bag unit for a vehicle seat having a squab and a back-rest, the back-rest including a frame covered with upholstery, the air-bag unit comprising: an inflatable air-bag connected to an inflator to inflate the air-bag upon deployment of the air-bag unit; the air-bag unit being mounted to the back-rest frame so as to be located inboard of part of the frame with the inflator being positioned to direct gas into the air-bag in a generally forward direction relative to the back-rest, such that the deployment of the air-bag unit will cause the air-bag to inflate so that at least part of the air-bag lies between the frame and an occupant of the vehicle seat, the air-bag unit mounted such that the inflator is located adjacent a rear-most region of the frame so that a significant length of the air-bag bears against the frame as the air-bag is inflated upon the deployment, wherein the air-bag unit comprises an inner air-bag and an outer air-bag, the inner air-bag being provided inside the outer air-bag, and both the inner and outer airbags being connected to the inflator so that the inner and outer air-bags are both inflated together upon the deployment of the air-bag unit, wherein the inner and outer air-bags are initially provided in a packed condition in which the inner bag and at least part of the outer bag are folded together in a substantially zigzag manner about fold lines lying substantially parallel to a major axis of the back-rest extending away from the squab, and wherein part of the outer air-bag extending past the forwardmost extent of the inner air-bag is initially spirally rolled about an axis substantially parallel to the axis of the back-rest extending away from the squab.

10. An air-bag unit for a vehicle seat according to claim 8, wherein part of the outer air-bag extending past the forwardmost extent of the inner air-bag is initially folded in a substantially zig-zag manner about fold lines lying substantially parallel to the axis of the back-rest extending away from the squab.

11. An air-bag arrangement for a vehicle seat according to claim 1, wherein the air-bag unit comprises a single air-bag having two inflatable chambers including a first and a second chamber, the first the first chamber being located immediately adjacent the inflator, and the second chamber being located forwardly of the first chamber so as to be spaced from the inflator by the first chamber, the air-bag being configured such that upon deployment of the air-bag unit, the first chamber is inflated substantially fully before the second chamber begins to inflate substantially.

12. An air-bag arrangement for a vehicle seat according to claim 11, wherein the first and second chambers are separated by a tear-seam configured to rupture when the first chamber becomes inflated to a predetermined gas pressure, so as to then allow the second chamber to be inflated.

13. An air-bag arrangement for a vehicle seat according to claim 11, wherein the first and second chambers are separated by a seam having one or more apertures along the length of the seam to allow the passage of gas therethrough upon deployment of the air-bag unit.

14. An air-bag arrangement of a vehicle seat according to claim 11, wherein a vent hole is provided in the air-bag in the region of a forwardmost part of the second chamber.

15. An air-bag arrangement for seat according to claim 1, wherein the air-bag unit comprises a single air-bag configured such that a forwardmost region of the air-bag remote from the inflator is folded inwardly of itself to define a re-entrant portion.

16. An air-bag arrangement for a vehicle seat according to claim 15, wherein adjacent regions of the re-entrant portion of the air-bag are initially stitched together by stitching to define a tear-seam configured to tear upon deployment of the air-bag unit.

17. An air-bag arrangement for a vehicle seat according to claim 11, wherein the air-bag is initially provided in a packed condition in which at least part of the air-bag is folded in a substantially zigzag manner about fold lines lying substantially parallel to a major axis of the back-rest extending away from the squab.

18. An air-bag unit for a vehicle seat according to claim 9, wherein the air-bag is initially provided in a packed condition in which at least part of the air-bag is initially spirally rolled about the major axis.

19. An air-bag arrangement for a vehicle seat according to claim 1, wherein the air-bag unit comprises an inboard air-bag and an outboard air-bag, the inboard air-bag being located inboard of the outboard air-bag and the outboard air-bag being located between the inboard air-bag and the region of the frame, both of the inboard air-bag and the outboard air-bag being connected to the inflator.

20. An air-bag arrangement for a vehicle seat according to claim 19, wherein the inboard and outboard air-bags are sized such that the inboard air-bag extends a greater distance between the region of the frame and the seat occupant as compared with the outboard air-bag.

21. An air-bag arrangement for a vehicle seat according to claim 19, wherein the inboard and outboard air-bags are sized such that the outboard air-bag extends further from the inflator than the inboard air-bag when the two air-bags are fully inflated upon deployment of the air-bag unit.

22. An air-bag arrangement for a vehicle seat according to claim 19, wherein the inboard and outboard air-bags are initially provided in a packed condition in which the inboard bag and at least part of the outboard air-bag are folded together in a substantially zigzag manner about fold lines lying substantially parallel to a major axis of the back-rest extending away from the squab.

23. An air-bag arrangement for a vehicle seat according to claim 19, wherein the inboard and outboard air-bags are initially provided in a packed condition in which the inboard bag and at least part of the outboard bag are spirally rolled together about an axis substantially parallel to a major axis of the back-rest extending away from the squab.

24. An air-bag arrangement for a vehicle seat according to claim 22, wherein part of the outboard air-bag extending past the forwardmost extent of the inboard air-bag is initially spirally rolled about an axis substantially parallel to the axis of the backrest extending away from the squab.

25. An air-bag arrangement for a vehicle seat according to claim 23, wherein part of the outboard air-bag extending past the forwardmost extent of the inboard air-bag is initially folded in a substantially zig-zag manner about fold lines lying substantially parallel to a major axis.

26. An air-bag unit according to claim 8, wherein the air-bag unit further comprises a cover within which the air-bag is initially packed, the cover defining a break-line configured to break upon the deployment of the air-bag such that the inflating air-bag bursts out of the cover; the cover being configured such that a part of the cover engages the back-rest frame upon inflation of the air-bag so as to extend substantially forwardly of the frame and to define a support against which the air-bag bears upon inflation.

27. An air-bag unit according to claim 26, wherein the part of the cover is configured to engage the frame so as also to extend inboard of the frame.

28. An air-bag unit according to claim 26, wherein the part of the cover comprises a reinforcing rib.

29. An air-bag unit for a vehicle seat according to claim 8, wherein the outer air-bag is larger than the inner air-bag in that the outer air-bag extends further forwards from the inflator when fully inflated as compared with the inner air-bag.

30. An air-bag unit according to claim 9, wherein the air-bag unit further comprises a cover within which the air-bag is initially packed, the cover defining a break-line configured to break upon the deployment of the air-bag such that the inflating air-bag bursts out of the cover; the cover being configured such that a part of the cover engages the back-rest frame upon inflation of the air-bag so as to extend substantially forwardly of the frame and to define a support against which the air-bag bears upon inflation.

31. An air-bag unit according to claim 30, wherein the part of the cover is configured to engage the frame so as also to extend inboard of the frame.

32. An air-bag unit according to claim 30, wherein the part of the cover comprises a reinforcing rib.

33. An air-bag unit for a vehicle seat according to claim 9, wherein the outer air-bag is larger than the inner air-bag in that the outer air-bag extends further forwards from the inflator when fully inflated as compared with the inner air-bag.

* * * * *